US012614529B2

(12) United States Patent
Saitoh

(10) Patent No.: US 12,614,529 B2
(45) Date of Patent: Apr. 28, 2026

(54) LIQUID CRYSTAL DISPLAY (LCD) DEVICE CAPABLE OF PERFORMING SWITCHING BETWEEN POLARITY INVERSION DRIVING METHODS WITHOUT CAUSING DETERIORATION IN DISPLAY QUALITY AND DRIVING METHOD FOR HE SAME

(71) Applicant: Sharp Display Technology Corporation, Kameyama City (JP)

(72) Inventor: Kohji Saitoh, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 0 days.

(21) Appl. No.: 18/933,067

(22) Filed: Oct. 31, 2024

(65) Prior Publication Data

US 2025/0157429 A1 May 15, 2025

(30) Foreign Application Priority Data

Nov. 13, 2023 (JP) ................................ 2023-192764

(51) Int. Cl.
*G09G 3/36* (2006.01)

(52) U.S. Cl.
CPC ......... *G09G 3/3614* (2013.01); *G09G 3/3677* (2013.01); *G09G 3/3696* (2013.01); *G09G 2310/0291* (2013.01); *G09G 2320/0209* (2013.01); *G09G 2320/0247* (2013.01); *G09G 2330/021* (2013.01)

(58) Field of Classification Search
CPC ...... G09G 3/36; G09G 3/3611; G09G 3/3614; G09G 3/3622; G09G 3/3625; G09G 3/3633; G09G 3/3641; G09G 3/364; G09G 3/3644; G09G 3/3648; G09G 3/3655; G09G 3/3659; G09G 3/3666; G09G 3/3674; G09G 3/3677; G09G 3/3681; G09G 3/3685; G09G 3/3692; G09G 3/3696
USPC .................................................... 345/87–104
See application file for complete search history.

(56) References Cited

U.S. PATENT DOCUMENTS

| | | | | |
|---|---|---|---|---|
| 6,677,925 | B1 | 1/2004 | Kawaguchi et al. | |
| 9,423,637 | B2 * | 8/2016 | Saitoh | G09G 3/3688 |
| 11,967,294 | B2 * | 4/2024 | Uehata | G09G 3/36 |
| 2007/0085800 | A1 * | 4/2007 | Lee | G09G 3/3655 345/94 |
| 2009/0167659 | A1 * | 7/2009 | Kim | G09G 3/3655 345/94 |

(Continued)

FOREIGN PATENT DOCUMENTS

| | | |
|---|---|---|
| JP | 2001-147420 A | 5/2001 |
| JP | 2019-133019 A | 8/2019 |

*Primary Examiner* — Ke Xiao
*Assistant Examiner* — Nelson Lam
(74) *Attorney, Agent, or Firm* — ScienBiziP, P.C.

(57) ABSTRACT

A common electrode driver includes an operational amplifier, a resistor, one end of which is connected to an inverting input terminal of the operational amplifier and the other end of which is connected to an output terminal of the operational amplifier, and an adjustment circuit that is configured to be able to adjust an internal combined resistance value in accordance with an applied polarity inversion driving method. The combined resistance value obtained when a one-column inversion driving method is applied is caused to be smaller than the combined resistance value obtained when a two-column inversion driving method is applied.

8 Claims, 18 Drawing Sheets

(56) References Cited

U.S. PATENT DOCUMENTS

| | | | | |
|---|---|---|---|---|
| 2013/0314393 | A1* | 11/2013 | Min | G09G 3/36 345/212 |
| 2014/0028535 | A1* | 1/2014 | Min | G09G 3/3655 345/87 |
| 2019/0235336 | A1 | 8/2019 | Uehata et al. | |
| 2021/0358446 | A1* | 11/2021 | Xiao | G09G 3/36 |

* cited by examiner

LIQUID CRYSTAL DISPLAY (LCD) DEVICE CAPABLE OF PERFORMING SWITCHING BETWEEN POLARITY INVERSION DRIVING METHODS WITHOUT CAUSING DETERIORATION IN DISPLAY QUALITY AND DRIVING METHOD FOR HE SAME

CROSS-REFERENCE TO RELATED APPLICATIONS

This application claims the benefit of priority to Japanese Patent Application Number 2023-192764 filed on Nov. 13, 2023. The entire contents of the above-identified application are hereby incorporated by reference.

BACKGROUND

Technical Field

The following disclosure relates to a liquid crystal display device that operates while performing switching between polarity inversion driving methods, and a driving method for the liquid crystal display device.

Known liquid crystal display devices have been used in various devices such as televisions, notebook computers, and portable phones. A display portion of a liquid crystal display device is provided with a plurality of pixel electrodes to which a video signal corresponding to a target display image is provided, and a common electrode for applying a voltage between the plurality of pixel electrodes via a liquid crystal. The common electrode is formed on a substrate constituting a liquid crystal panel, and a predetermined voltage is supplied from a circuit provided on the drive substrate to the common electrode. Note that, as described later, a value of a voltage output from the circuit provided on the drive substrate to the common electrode does not necessarily coincide with a value of an actual voltage of the common electrode in the liquid crystal panel. Thus, in this specification, for the sake of convenience, the voltage output from the circuit provided on the drive substrate to the common electrode is referred to as an "output common voltage", and the voltage of the common electrode in the liquid crystal panel is referred to as an "in-panel common voltage". When the output common voltage and the in-panel common voltage are not distinguished from each other, the term "common voltage" is used. Note that the common voltage (voltage of the common electrode) is often referred to as "Vcom".

In recent years, there has been an increasing demand for low power consumption in liquid crystal display devices. One known driving method for achieving low power consumption is referred to as low-frequency driving. In the low-frequency driving, a drive frequency (refresh rate) of a liquid crystal display device is reduced to ½, ⅓, or the like of a standard frequency. Since the drive frequency of a known general liquid crystal display device is 60 Hz, the drive frequency is reduced to 30 Hz, 20 Hz, or the like when the low-frequency driving is adopted.

There is also a liquid crystal display device in which switching between normal driving and low-frequency driving is performed during operation. For example, there is also a liquid crystal display device in which switching between normal driving in which the drive frequency is 60 Hz and low-frequency driving in which the drive frequency is 30 Hz is performed. Since the drive frequencies are different between the normal driving and the low-frequency driving, the refresh cycles (cycles of writing a video signal to a liquid crystal capacitance) are also different. Due to such a difference in the refresh cycles, flicker may be visually recognized. The reason is that the magnitude of the influence of a leakage current on an effective voltage is different between the normal driving and the low-frequency driving, resulting in an effective voltage imbalance. Thus, such a liquid crystal display device is provided with an offset voltage setting circuit that switches the level of a common voltage for each of the refresh cycles whose lengths are different from each other, in order to suppress the occurrence of flicker caused by the effective voltage imbalance.

However, when an output common voltage VcomOUT is generated by such a configuration, as illustrated in FIG. 11, that is constituted of a voltage follower circuit 900 and an offset voltage setting circuit 910, an in-panel common voltage fluctuates due to presence of a parasitic capacitance and the like formed between a source bus line (video signal line) and a common electrode, for example, depending on the display image. Specifically, even when the output common voltage VcomOUT is a constant voltage for each drive frequency as indicated by a thick dotted line denoted by a reference sign 91 in FIG. 12, the in-panel common voltage fluctuates as indicated by a solid line denoted by a reference sign 92 in FIG. 12, depending on the display image. Due to such fluctuation of the in-panel common voltage, a display abnormality referred to as crosstalk may occur. In this regard, even when the in-panel common voltage fluctuates, crosstalk does not occur as long as the in-panel common voltage converges to a target constant voltage by the end of each horizontal scan period. On the other hand, when the in-panel common voltage does not converge to the target constant voltage by the end of each horizontal scan period, crosstalk occurs. Therefore, crosstalk is likely to occur particularly when a charging period (a length of one horizontal scan period) of a liquid crystal is short in order to perform high-resolution display.

One example of crosstalk will now be described with reference to FIG. 13. In a display portion illustrated in FIG. 13, it is assumed that a killer pattern is displayed in a region P1 and a halftone image is displayed in regions P2 to P5. In such a case, a boundary between the region P2 and the region P3, a boundary between the region P2 and the region P4, a boundary between the region P3 and the region P5, and a boundary between the region P4 and the region P5 are visually recognized. FIG. 13 indicates these boundaries by thick dotted lines.

For example, JP 2019-133019 A discloses a liquid crystal display device including a circuit referred to as a "Vcom feedback circuit" for suppressing the occurrence of crosstalk as described above. As illustrated in FIG. 14, a Vcom feedback circuit 920 includes a resistor 921, a resistor 922, and an operational amplifier 923. From the connection relationship between the resistor 921, the resistor 922, and the operational amplifier 923, it is understood that the Vcom feedback circuit 920 is constituted of an inverting amplifier. With such a configuration, the Vcom feedback circuit 920 outputs, as the output common voltage VcomOUT, a voltage obtained by correcting an adjusted reference voltage (a voltage obtained by an offset voltage setting circuit adjusting a reference voltage) VREFa based on a voltage VcomFB obtained by feeding back an in-panel common voltage through a dedicated wiring line (hereinafter, simply referred to as a "feedback voltage"). In the Vcom feedback circuit 920 described above, a ratio between a resistance value of the resistor 921 and a resistance value of the resistor 922 is adjusted such that the in-panel common voltage converges to a target constant voltage by the end of each horizontal scan period. When a liquid crystal display device including the Vcom feedback circuit 920 is configured to perform switching between normal driving in which the drive frequency is 60 Hz and low-frequency driving in which the drive frequency is 30 Hz, when a waveform of the output common voltage VcomOUT is a waveform as indicated by a thick dotted line denoted by a reference sign 93 in FIG. 15, the in-panel common voltage fluctuates as indicated by a solid line denoted by a reference sign 94 in FIG. 15, for example. From FIG. 15, it is understood that the in-panel common voltage converges to the target constant voltage by the end of each horizontal scan period. In other words, the occurrence of crosstalk is suppressed even when the in-panel common voltage fluctuates.

Note that JP 2001-147420 A discloses a technique for generating an output common voltage based on a coupling signal corresponding to a sum of the outputs of all data signal lines.

SUMMARY

With regard to the Vcom feedback circuit 920 (see FIG. 14), when the ratio of the resistance value of the resistor 922 to the resistance value of the resistor 921 is referred to as a "correction intensity", as a value of the correction intensity increases, the time required for the in-panel common voltage to converge is shortened, but the power consumption in the operational amplifier 923 increases. Therefore, the correction intensity is adjusted so that the in-panel common voltage converges to the target constant voltage by the end of each horizontal scan period, while suppressing an increase in the power consumption.

Incidentally, with regard to a liquid crystal display device in which switching between normal driving and low-frequency driving is performed during operation, in the related art, a one-column inversion driving method (one-source line inversion driving method) is typically used as a polarity inversion driving method (a driving method in which the polarity of a liquid crystal application voltage is inverted in order to prevent a deterioration in a liquid crystal). However, in recent years, in order to prevent an increase in the power consumption at the time of high-frequency driving, a two-column inversion driving method (two-source line inversion driving method) is sometimes adopted. Note that the one-column inversion driving method is a method in which the polarity of all pixels is inverted for every frame while inverting the polarity for every pixel (every column) (every source bus line) in each row (in a direction in which gate bus lines extend), and the two-column inversion driving method is a method in which the polarity of all pixels is inverted for every frame while inverting the polarity for every two pixels (every two columns) (every two source bus lines) in each row. When the one-column inversion driving method is adopted, for example, a state of polarity as illustrated in a section A of FIG. 16, and a state of polarity as illustrated in a section B of FIG. 16, alternately appear for each frame. Note that in FIG. 16, one gate bus line is denoted by a reference sign GL and one source bus line is denoted by a reference sign SL (the same applies to FIG. 17). When the two-column inversion driving method is adopted, for example, a state of polarity as illustrated in a section A of FIG. 17, and a state of polarity as illustrated in a section B of FIG. 17, alternately appear for each frame.

As described above, in recent years, there is also a liquid crystal display device in which the two-column inversion driving method is adopted. However, in the liquid crystal display device in which the two-column inversion driving method is adopted, vertical stripes may be visually recognized at the time of low-frequency driving. Therefore, in a liquid crystal display device that is capable of operating at a wide range of refresh rates, it is conceivable to switch the polarity inversion driving method from the two-column inversion driving method to the one-column inversion driving method at the time of low-frequency driving. However, when the one-column inversion driving method is adopted, a deterioration in display quality, such as a phenomenon called "greenish" in which green appears strongly is likely to occur.

The in-panel common voltage in a case where the correction intensity is adjusted so as to converge to the target constant voltage by the end of each horizontal scan period will be described with reference to FIG. 18. In FIG. 18, a thick dotted line denoted by a reference sign 97 indicates a waveform of the output common voltage VcomOUT. In a liquid crystal display device in which the two-column inversion driving method is adopted, the in-panel common voltage fluctuates as indicated by a solid line denoted by a reference sign 95 in FIG. 18, for example. In contrast, in a liquid crystal display device in which the one-column inversion driving method is adopted, the in-panel common voltage fluctuates as indicated by a thick solid line denoted by a reference sign 96 in FIG. 18, for example. Note that the fluctuation of the in-panel common voltage also depends on the display image (display pattern). As illustrated in FIG. 18, when the one-column inversion driving method is adopted, the in-panel common voltage fluctuates to a greater extent than when the two-column inversion driving method is adopted. From this point also, it is understood that when the one-column inversion driving method is adopted, the deterioration in the display quality is likely to occur.

Thus, an object of the following disclosure is to realize a liquid crystal display device capable of operating while performing switching between polarity inversion driving methods without causing a deterioration in display quality.

(1) A liquid crystal display device according to some embodiments of the disclosure includes a display portion including a plurality of video signal lines, a plurality of scanning signal lines, a plurality of pixel electrodes provided respectively corresponding to intersections between the plurality of video signal lines and the plurality of scanning signal lines, and a common electrode provided common to the plurality of pixel electrodes, a video signal line drive circuit configured to drive the plurality of video signal lines, a scanning signal line drive circuit configured to drive the plurality of scanning signal lines, and a common electrode drive circuit configured to drive the common electrode.

The liquid crystal display device is configured to perform switching between polarity inversion driving methods being methods for inverting a polarity of a voltage applied between each of the plurality of pixel electrodes and the common electrode.

The common electrode drive circuit includes an operational amplifier including an inverting input terminal, a non-inverting input terminal to which a reference voltage is supplied, the reference voltage being a voltage to be applied to the common electrode, and an output terminal connected to the common electrode, a first resistor, one end of the first resistor being connected to the inverting input terminal of the operational amplifier, and another end of the first resistor being connected to the output terminal of the operational amplifier, and an adjustment circuit including a first terminal to which a feedback voltage of the voltage of the common electrode is supplied and a second terminal connected to the inverting input terminal of the operational amplifier, the adjustment circuit being configured to adjust a combined resistance value of the first terminal and the second terminal in accordance with the applied polarity inversion driving method.

(2) Further, a liquid crystal display device according to some embodiments of the disclosure includes the above-described configuration (1), and the liquid crystal display device is configured to perform switching between a one-column inversion driving method in which the polarity of the voltage applied between each of the plurality of pixel electrodes and the common electrode is inverted for every one of the video signal lines in a direction in which the plurality of scanning signal lines extend, and an N-column inversion driving method in which the polarity of the voltage applied between each of the plurality of pixel electrodes and the common electrode is inverted for every N of the video signal lines in the direction in which the plurality of scanning signal lines extend, N being an integer of two or more. The adjustment circuit causes the combined resistance value obtained when the applied polarity inversion driving method is the one-column inversion driving method to be smaller than the combined resistance value obtained when the applied polarity inversion driving method is the N-column inversion driving method.

(3) Further, a liquid crystal display device according to some embodiments of the disclosure includes the above-described configuration (1), and in the liquid crystal display device, the adjustment circuit includes a second resistor, one end of the second resistor being connected to the first terminal, and another end of the second resistor being connected to the second terminal, a third resistor provided in parallel with the second resistor between the first terminal and the second terminal, and a switching element provided in series with the third resistor between the first terminal and the second terminal, and including a control terminal, a first conduction terminal, and a second conduction terminal.

A switching control signal configured to control a state of the switching element in accordance with the applied polarity inversion driving method is supplied to the control terminal of the switching element.

(4) Further, in addition to the above-described configuration (3), a liquid crystal display device according to some embodiments of the disclosure includes a timing control circuit configured to control an operation of the video signal line drive circuit, an operation of the scanning signal line drive circuit, and an operation of the common electrode drive circuit.

The liquid crystal display device is configured to perform switching of drive frequencies between a first frequency and a second frequency lower than the first frequency.

The timing control circuit includes a drive frequency determination portion configured to determine the drive frequency to be either the first frequency or the second frequency, and a polarity inversion driving method determination portion configured to determine the polarity inversion driving method based on the drive frequency determined by the drive frequency determination portion, and to output the switching control signal in accordance with the determined polarity inversion driving method.

(5) Further, a liquid crystal display device according to some embodiments of the disclosure includes the above-described configuration (4), and the liquid crystal display device is configured to perform switching between the one-column inversion driving method in which the polarity of the voltage applied between each of the plurality of pixel electrodes and the common electrode is inverted for every one of the video signal lines in the direction in which the plurality of scanning signal lines extend, and the N-column inversion driving method in which the polarity of the voltage applied between each of the plurality of pixel electrodes and the common electrode is inverted for every N of the video signal lines in the direction in which the plurality of scanning signal lines extend, N being an integer of two or more.

The polarity inversion driving method determination portion determines the polarity inversion driving method to be the N-column inversion driving method when the drive frequency determined by the drive frequency determination portion is the first frequency, and determines the polarity inversion driving method to be the one-column inversion driving method when the drive frequency determined by the drive frequency determination portion is the second frequency.

(6) Further, a liquid crystal display device according to some embodiments of the disclosure includes the above-described configuration (5), and in the liquid crystal display device, the adjustment circuit maintains the switching element in an on state when the applied polarity inversion driving method is the one-column inversion driving method, and maintains the switching element in an off state when the applied polarity inversion driving method is the N-column inversion driving method.

(7) Further, a liquid crystal display device according to some embodiments of the disclosure includes the above-described configuration (3) or (4), and the liquid crystal display device is configured to perform switching between the one-column inversion driving method in which the polarity of the voltage applied between each of the plurality of pixel electrodes and the common electrode is inverted for every one of the video signal lines in the direction in which the plurality of scanning signal lines extend, and the N-column inversion driving method in which the polarity of the voltage applied between each of the plurality of pixel electrodes and the common electrode is inverted for every N of the video signal lines in the direction in which the plurality of scanning signal lines extend, N being an integer of two or more. The adjustment circuit maintains the switching element in an on state when the applied polarity inversion driving method is the one-column inversion driving method, and maintains the switching element in an off state when the applied polarity inversion driving method is the N-column inversion driving method.

(8) Further, a driving method according to some embodiments of the disclosure is a driving method for a liquid crystal display device.

The liquid crystal display device includes a display portion including a plurality of video signal lines, a plurality of scanning signal lines, a plurality of pixel electrodes provided respectively corresponding to intersections between the plurality of video signal lines and the plurality of scanning signal lines, and a common electrode provided common to the plurality of pixel electrodes, a video signal line drive circuit configured to drive the plurality of video signal lines, a scanning signal line drive circuit configured to drive the plurality of scanning signal lines, and a common electrode drive circuit configured to drive the common electrode.

The common electrode drive circuit includes an operational amplifier including an inverting input terminal, a non-inverting input terminal to which a reference voltage is supplied, the reference voltage being a voltage to be applied to the common electrode, and an output terminal connected to the common electrode, a first resistor, one end of the first resistor being connected to the inverting input terminal of the operational amplifier, and another end of the first resistor being connected to the output terminal of the operational amplifier, and an adjustment circuit including a first terminal to which a feedback voltage of the voltage of the common electrode is supplied, a second terminal connected to the inverting input terminal of the operational amplifier, and at least one resistor.

The driving method includes determining a drive frequency to be either a first frequency or a second frequency lower than the first frequency, determining, in accordance with the determined drive frequency, a polarity inversion driving method to be either a one-column inversion driving method in which a polarity of a voltage applied between each of the plurality of pixel electrodes and the common electrode is inverted for every one of the video signal lines in a direction in which the plurality of scanning signal lines extend, or an N-column inversion driving method in which the polarity of the voltage applied between each of the plurality of pixel electrodes and the common electrode is inverted for every N of the video signal lines in the direction in which the plurality of scanning signal lines extend, and adjusting, in accordance with the determined polarity inversion driving method, a combined resistance value of the first terminal and the second terminal.

In a liquid crystal display device according to some embodiments of the disclosure, in a common electrode drive circuit, an inverting amplifier is constituted of an operational amplifier, a first resistor, and an adjustment circuit. Here, a combined resistance value in the adjustment circuit can be adjusted in accordance with a polarity inversion driving method that is being applied. That is, with regard to the inverting amplifier, a ratio of the resistance value of the first resistor to the combined resistance value can be adjusted in accordance with the applied polarity inversion driving method. Thus, for example, by causing the ratio of the resistance value of the first resistor to the combined resistance value to be larger when a one-column inversion driving method is applied than when a two-column inversion driving method is applied, a deterioration in display quality when the one-column inversion driving method is applied can be suppressed. As described above, a liquid crystal display device is realized that is capable of operating while performing switching between polarity inversion driving methods without causing a deterioration in display quality.

BRIEF DESCRIPTION OF DRAWINGS

The disclosure will be described with reference to the accompanying drawings, wherein like numbers reference like elements.

DESCRIPTION OF EMBODIMENTS

An embodiment will be described below with reference to the accompanying drawings.

1. OVERALL CONFIGURATION AND OPERATION OUTLINE

Figure 2:
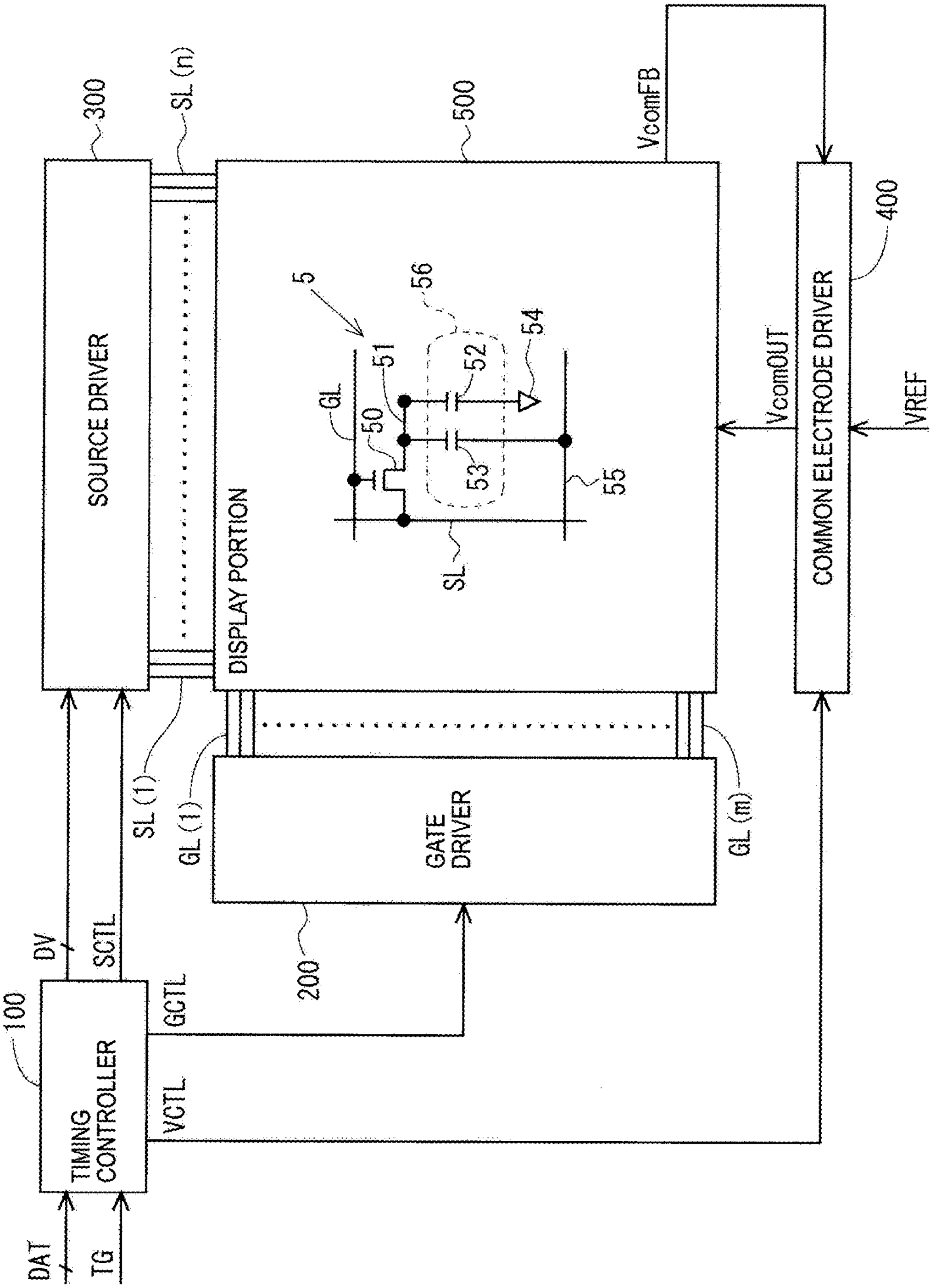
FIG. 2 is a block diagram illustrating an overall configuration of a liquid crystal display device according to the embodiment.

FIG. 2 is a block diagram illustrating an overall configuration of a liquid crystal display device according to an embodiment. The liquid crystal display device includes a timing controller (timing control circuit) 100, a gate driver (scanning signal line drive circuit) 200, a source driver (video signal line drive circuit) 300, a common electrode driver (common electrode drive circuit) 400, and a display portion 500. Note that FIG. 2 is a diagram illustrating a functional configuration, and thus, the positional relationships between constituent elements, and the like are different from actual relationships, and the like.

In the display portion 500, a plurality of source bus lines (video signal lines) SL and a plurality of gate bus lines (scanning signal lines) GL are disposed. A pixel forming section 5 for forming a pixel is provided corresponding to each of intersections between the plurality of source bus lines SL and the plurality of gate bus lines GL. In other words, the display portion 500 includes a plurality of the pixel forming sections 5. Each pixel forming section 5 includes a thin film transistor (pixel TFT) 50 serving as a switching element, in which a control terminal is connected to the gate bus line GL passing through the corresponding intersection and a first conduction terminal is connected to the source bus line SL passing through the above corresponding intersection, a pixel electrode 51 connected to a second conduction terminal of the thin film transistor 50, a common electrode 54 and an auxiliary capacitance electrode 55 provided common to the plurality of pixel forming sections 5 (i.e., the common electrode 54 and the auxiliary capacitance electrode 55 provided common to the plurality of pixel electrodes 51), a liquid crystal capacitance 52 formed by the pixel electrode 51 and the common electrode 54, and an auxiliary capacitance 53 formed of the pixel electrode 51 and the auxiliary capacitance electrode 55. A pixel capacitance 56 is constituted of the liquid crystal capacitance 52 and the auxiliary capacitance 53. In FIG. 2, only one pixel forming section 5 is illustrated.

Figure 3:
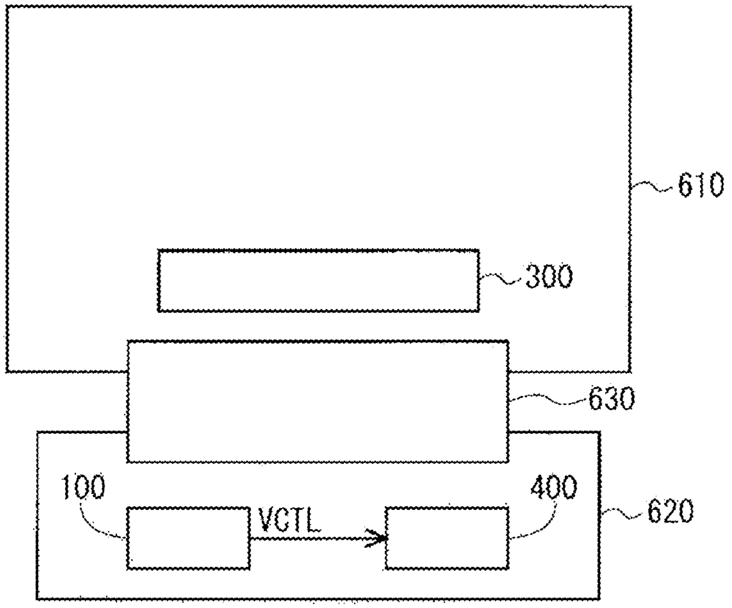
FIG. 3 is a diagram for describing a configuration of a substrate of the liquid crystal display device according to the embodiment.
Figure 4:
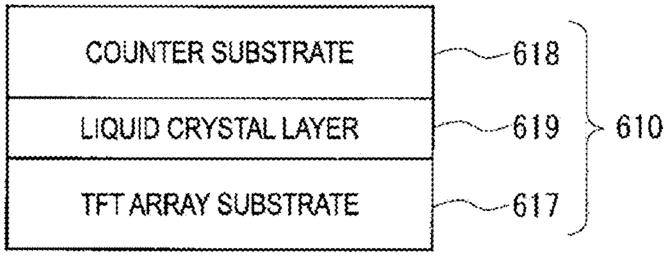
FIG. 4 is a schematic diagram illustrating a configuration of a liquid crystal panel according to the embodiment.

FIG. 3 is a diagram for describing a configuration of a substrate of the liquid crystal display device. Note that the configuration described hereinafter is merely an example, and no such limitation is intended. The liquid crystal display device includes a liquid crystal panel 610 including the display portion 500, a PCB assembly (PCBA) 620 serving as a drive substrate, and a flexible printed circuit board (FPC) 630. The liquid crystal panel 610 includes a TFT array substrate 617 including the pixel electrode 51 and on which a TFT array is formed, a counter substrate 618 on which the common electrode 54, a color filter, and the like are formed, and a liquid crystal layer 619 sandwiched between the TFT array substrate 617 and the counter substrate 618 (see FIG. 4). Note that illustration of a polarizer is omitted from FIG. 4.

The source driver 300 is provided in the form of an IC chip in a frame region on the TFT array substrate 617 constituting the liquid crystal panel 610. Note that the gate driver 200 is formed in a monolithic manner on the TFT array substrate 617. A wiring line for transmitting various signals from the timing controller 100 to the liquid crystal panel 610, and the like are formed on the FPC 630. The PCBA 620 is provided with the timing controller 100 and the common electrode driver 400. The common electrode driver 400 is provided with a common voltage control signal VCTL from the timing controller 100. In this regard, for example, inter-integrated circuit (I2C) communication is adopted as a communication interface between the timing controller 100 and the common electrode driver 400.

In the present embodiment, the common electrode 54 is one planar electrode, and an in-panel common voltage (a voltage of the common electrode 54 in the liquid crystal panel 610) is provided as a feedback voltage VcomFB to the common electrode driver 400 through a dedicated wiring line that connects at least one point on the one electrode and the common electrode driver 400.

Note that, when an IPS mode is adopted as a mode of a liquid crystal, the pixel electrode 51 and the common electrode 54 are formed on the same substrate. The disclosure can also be applied to such a case.

Next, operations of the constituent elements illustrated in FIG. 2 will be described. The timing controller 100 controls an operation of the gate driver 200, the source driver 300, and the common electrode driver 400. Specifically, the timing controller 100 receives image data DAT and a timing signal group (a horizontal synchronization signal, a vertical synchronization signal, and the like) TG transmitted from the outside, and outputs a digital video signal DV, a gate control signal GCTL for controlling an operation of the gate driver 200, a source control signal SCTL for controlling an operation of the source driver 300, and a common voltage control signal VCTL for controlling an operation of the common electrode driver 400. The gate control signal GCTL includes a gate start pulse signal, a gate clock signal, and the like. The source control signal SCTL includes a source start pulse signal, a source clock signal, a latch strobe signal, and the like. The common voltage control signal VCTL includes a polarity inversion driving method switching signal SPOL described later, and a reference voltage adjustment signal SB described later.

The gate driver 200 repeats application of an active scanning signal to each of the gate bus lines GL with one vertical scanning period as a cycle, based on the gate control signal GCTL transmitted from the timing controller 100. In this manner, the gate driver 200 drives the plurality of gate bus lines GL disposed in the display portion 500.

The source driver 300 applies a driving video signal to each of the source bus lines SL, based on the digital video signal DV and the source control signal SCTL transmitted from the timing controller 100. At this time, the source driver 300 sequentially holds the digital video signals DV each indicating a voltage to be applied to a respective one of the source bus lines SL, at a timing when pulses of the source clock signal are generated. Then, the held digital video signals DV are converted into analog voltages at a timing when pulses of the latch strobe signal are generated. The converted analog voltages are concurrently applied to all of the source bus lines SL as the driving video signals. As described above, the source driver 300 drives the plurality of source bus lines SL disposed in the display portion 500.

The common electrode driver 400 receives a reference voltage VREF being a voltage serving as a reference for common voltage generation, the common voltage control signal VCTL transmitted from the timing controller 100, and the feedback voltage VcomFB described above, and outputs, as an output common voltage VcomOUT, a voltage obtained by appropriately correcting the reference voltage VREF. The output common voltage VcomOUT is applied to the common electrode 54. In this manner, the common electrode driver 400 drives the common electrode 54.

As described above, while the common voltage is applied to the common electrode 54, the scanning signal is applied to the gate bus line GL and the driving video signal is applied to the source bus line SL, whereby an image based on the image data DAT transmitted from the outside is displayed on the display portion 500.

Note that the liquid crystal display device according to the present embodiment is configured to be able to perform switching between polarity inversion driving methods in which the polarity of a voltage applied between each of the plurality of pixel electrodes 51 and the common electrode 54 is inverted. In this regard, in the present embodiment, it is assumed that a configuration is adopted in which switching between a one-column inversion driving method and a two-column inversion driving method is possible. However, the disclosure is not limited thereto.

2. TIMING CONTROLLER

Figure 5:
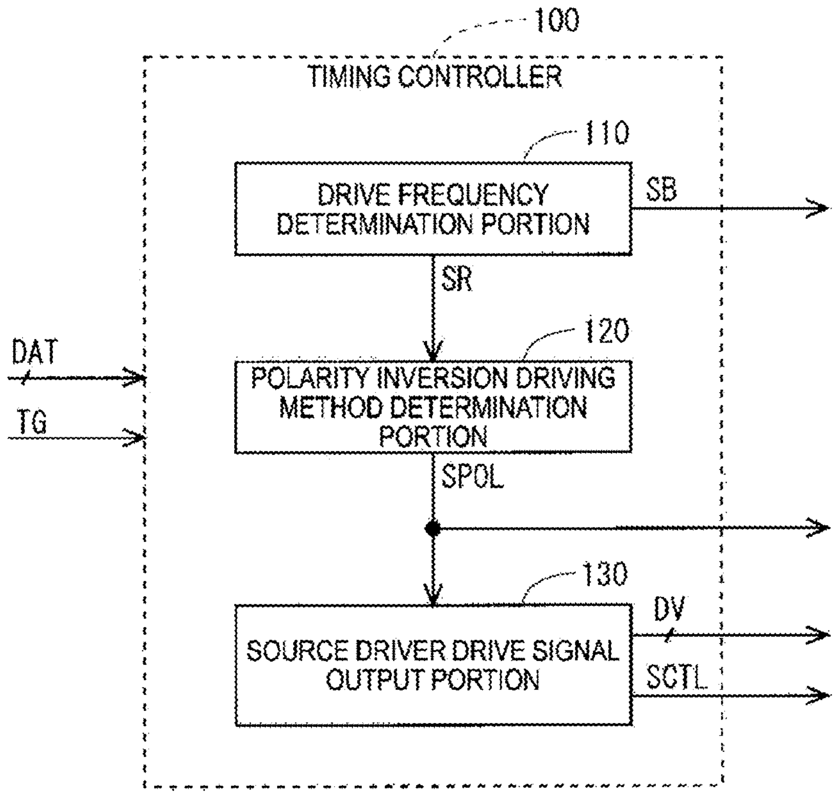
FIG. 5 is a block diagram for describing a configuration relating to control of the common electrode driver in a configuration of a timing controller according to the embodiment.

A configuration relating to control of the common electrode driver 400 in a configuration of the timing controller 100 will be described with reference to the block diagram illustrated in FIG. 5. As illustrated in FIG. 5, the timing controller 100 includes a drive frequency determination portion 110, a polarity inversion driving method determination portion 120, and a source driver drive signal output portion 130.

The drive frequency determination portion 110 determines the drive frequency based on the timing signal group (the horizontal synchronization signal, the vertical synchronization signal, and the like) TG and the image data DAT. Then, the drive frequency determination portion 110 outputs a drive frequency instruction signal SR indicating the determined drive frequency and the reference voltage adjustment signal SB for adjusting the above-described reference voltage VREF. The drive frequency instruction signal SR is supplied to the polarity inversion driving method determination portion 120, and the reference voltage adjustment signal SB is supplied to the common electrode driver 400.

The polarity inversion driving method determination portion 120 determines a polarity inversion driving method to be applied, based on the drive frequency instruction signal SR. In the present embodiment, specifically, it is determined which one of the one-column inversion driving method and the two-column inversion driving method is to be applied. More specifically, when the drive frequency indicated by the drive frequency instruction signal SR is 60 Hz, the polarity inversion driving method to be applied is determined to be the two-column inversion driving method, and when the drive frequency indicated by the drive frequency instruction signal SR is 30 Hz, the polarity inversion driving method to be applied is determined to be the one-column inversion driving method. Then, the polarity inversion driving method determination portion 120 outputs the polarity inversion driving method switching signal SPOL corresponding to the determined polarity inversion driving method. The polarity inversion driving method switching signal SPOL is supplied to the source driver drive signal output portion 130 and the common electrode driver 400.

Based on the polarity inversion driving method switching signal SPOL, the source driver drive signal output portion 130 outputs the source control signal SCTL, and the digital video signal DV based on the image data DAT. The source control signal SCTL and the digital video signal DV are supplied to the source driver 300.

3. COMMON ELECTRODE DRIVER

Figure 1:
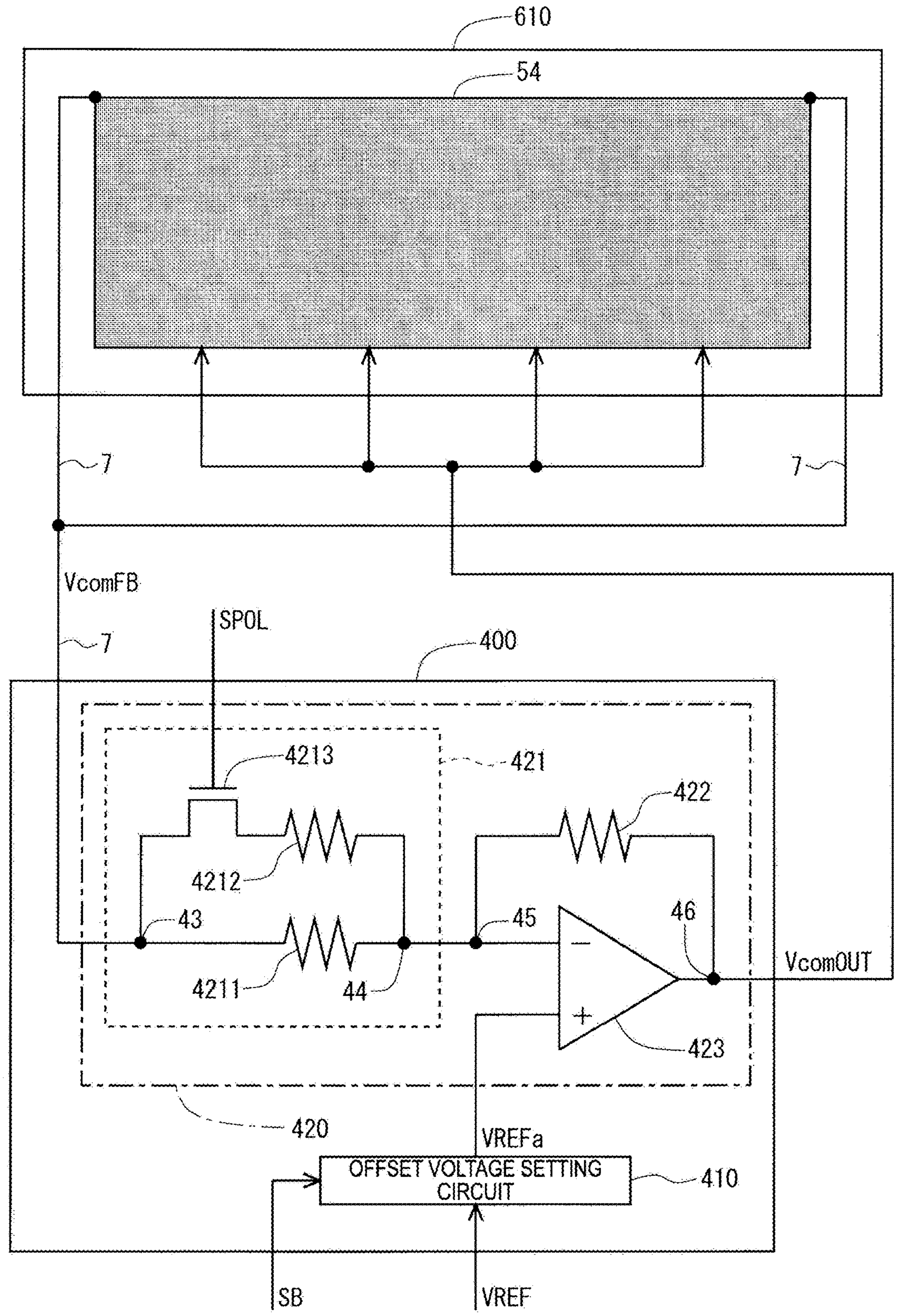
FIG. 1 is a diagram for describing a configuration of a common electrode driver according to an embodiment.

A configuration of the common electrode driver 400 will be described with reference to FIG. 1. As illustrated in FIG. 1, the common electrode driver 400 includes an offset voltage setting circuit 410 and a Vcom feedback circuit 420. The output common voltage VcomOUT output from the Vcom feedback circuit 420 is supplied to the common electrode 54 in the liquid crystal panel 610. The in-panel common voltage (the voltage of the common electrodes 54 in the liquid crystal panel 610) is supplied to the Vcom feedback circuit 420 as the feedback voltage VcomFB, via a dedicated wiring line 7.

Figure 6:
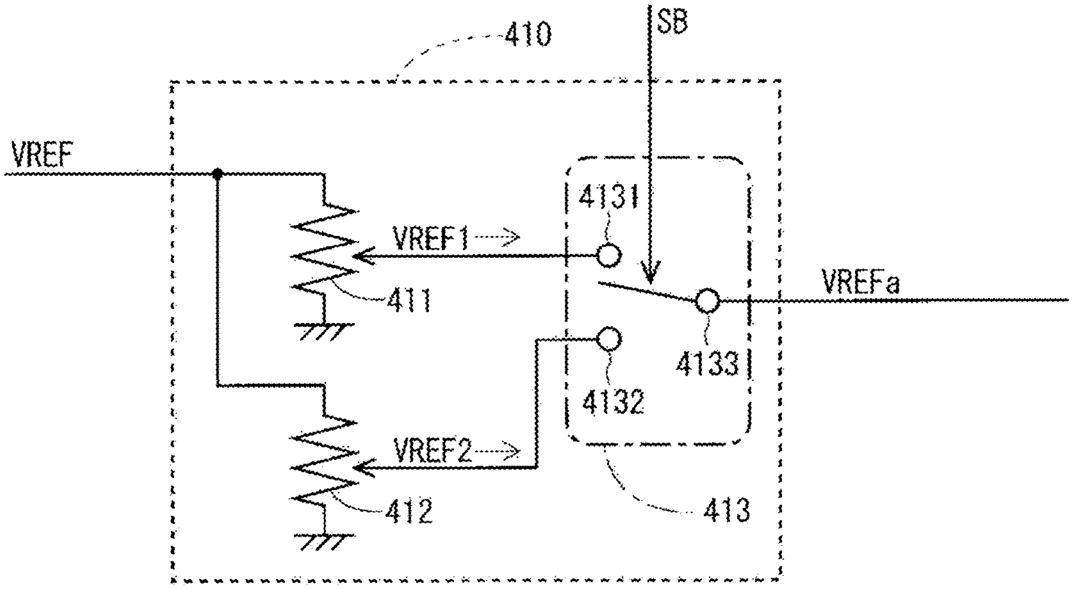
FIG. 6 is a circuit diagram illustrating a detailed configuration of an offset voltage setting circuit according to the embodiment.

A detailed configuration of the offset voltage setting circuit 410 is illustrated in FIG. 6. The offset voltage setting circuit 410 includes a resistor 411, a resistor 412, and a changeover switch 413. One end of the resistor 411 is provided with the reference voltage VREF, and the other end is grounded. One end of the resistor 412 is also provided with the reference voltage VREF, and the other end is grounded. The resistor 411 and the resistor 412 are each a variable resistor. A first reference voltage VREF1 is taken out from a tap of the resistor 411, and a second reference voltage VREF2 is taken out from a tap of the resistor 412. The changeover switch 413 includes a first input terminal 4131 to which the first reference voltage VREF1 is supplied, a second input terminal 4132 to which the second reference voltage VREF2 is supplied, and an output terminal 4133 connected to a non-inverting input terminal of an operational amplifier 423 (see FIG. 1) in the Vcom feedback circuit 420. In the changeover switch 413, a connection destination of the output terminal 4133 is switched between the first input terminal 4131 and the second input terminal 4132, based on the reference voltage adjustment signal SB transmitted from the timing controller 100. With the configuration described above, the first reference voltage VREF1 or the second reference voltage VREF2 is supplied to the non-inverting input terminal of the operational amplifier 423 as an adjusted reference voltage VREFa.

For example, a voltage value of the first reference voltage VREF1 is higher than a voltage value of the second reference voltage VREF2, the output terminal 4133 is connected to the first input terminal 4131 at the time of normal driving (when the drive frequency is 60 Hz), and the output terminal 4133 is connected to the second input terminal 4132 at the time of low-frequency driving (when the drive frequency is 30 Hz). In this example, a higher voltage is supplied to the non-inverting input terminal of the operational amplifier 423 in the Vcom feedback circuit 420 at the time of the normal driving than at the time of the low-frequency driving. However, the configuration is not limited thereto.

As illustrated in FIG. 1, the Vcom feedback circuit 420 includes an adjustment circuit 421, a resistor 422, and the operational amplifier 423. The adjustment circuit 421 includes a resistor 4211, a resistor 4212, and a field-effect transistor (FET) 4213 serving as a switching element. The adjustment circuit 421 is a circuit for adjusting the above-described correction intensity, and is configured to be able to adjust an internal combined resistance value, as will be described later. One end of the resistor 4211 is connected to a node 43, and the other end is connected to a node 44. In the field-effect transistor 4213, the polarity inversion driving method switching signal SPOL is supplied to a control terminal, a first conduction terminal is connected to the node 43, and a second conduction terminal is connected to one end of the resistor 4212. One end of the resistor 4212 is connected to the second conduction terminal of the field-effect transistor 4213, and the other end is connected to the node 44. As described above, the resistor 4211 and the resistor 4212 are connected to each other in parallel in the adjustment circuit 421. Incidentally, the node 43 is connected to the dedicated wiring line 7 for transmitting the feedback voltage VcomFB. Thus, the feedback voltage VcomFB is supplied to the one end of the resistor 4211 and to the first conduction terminal of the field-effect transistor 4213. One end of the resistor 422 is connected to a node 45, and the other end is connected to an output terminal 46 of the operational amplifier 423. In the operational amplifier 423, an inverting input terminal is connected to the node 45, the adjusted reference voltage VREFa is supplied to the non-inverting input terminal, and the output terminal 46 is connected to the other end of the resistor 422 and to the common electrode 54. Since the node 44 and the node 45 are connected to each other, the other end of the resistor 4211, the other end of the resistor 4211, the other end of the resistor 4212, the one end of the resistor 422, and the inverting input terminal of the operational amplifier 423 are connected to each other.

Note that, in the present embodiment, a switching control signal is realized by the polarity inversion driving method switching signal SPOL, a first resistor is realized by the resistor 422, a second resistor is realized by the resistor 4211, and a third resistor is realized by the resistor 4212. In addition, the node 43 corresponds to a first terminal, and the node 44 corresponds to a second terminal.

Here, a voltage that is to be applied to the common electrodes 54 (in the present embodiment, the first reference voltage VREF1 or the second reference voltage VREF2) and that is to be applied to the non-inverting input terminal of the operational amplifiers 423 is referred to as a "target voltage". Since the adjustment circuit 421 includes the resistors, an inverting amplifier is constituted of the adjustment circuit 421, the resistor 422, and the operational amplifier 423. Thus, when the feedback voltage VcomFB is higher than the target voltage, a voltage lower than the target voltage is output from the output terminal 46 of the operational amplifier 423 as the output common voltage VcomOUT, and when the feedback voltage VcomFB is lower than the target voltage, a voltage higher than the target voltage is output from the output terminal 46 of the operational amplifier 423 as the output common voltage VcomOUT. By supplying the voltage obtained by correcting the target voltage to the common electrode 54, the in-panel common voltage in a fluctuating state gradually converges to the target voltage.

4. ADJUSTMENT OF CORRECTION INTENSITY

Next, how the above-described correction intensity is adjusted will be described. With regard to the Vcom feedback circuit 420, a ratio of the resistance value of the resistor 422 to a combined resistance value of the node 43 and the node 44 is the correction intensity in the present embodiment. In the present embodiment, the correction intensity is adjusted by controlling the on/off state of the field-effect transistor 4213 to change the combined resistance value between the node 43 and the node 44. Note that, as described above, as the value of the correction intensity increases, the time required for the in-panel common voltage to converge is shortened, but the power consumption in the operational amplifier 423 increases. Hereinafter, the resistance value of the resistor 4211 will be denoted by R1, the resistance value of the resistor 4212 will be denoted by R2, the resistance value of the resistor 422 will be denoted by Rb, the above-described combined resistance value when the one-column inversion driving method is applied will be denoted by Ra1, and the above-described combined resistance value when the two-column inversion driving method is applied will be denoted by Ra2.

In the present embodiment, when the one-column inversion driving method is applied, the polarity inversion driving method switching signal SPOL is maintained at a high level by the polarity inversion driving method determination portion 120, and when the two-column inversion driving method is applied, the polarity inversion driving method switching signal SPOL is maintained at a low level by the polarity inversion driving method determination portion 120. When the polarity inversion driving method switching signal SPOL is maintained at the high level, the field-effect transistor 4213 is maintained in an on state. On the other hand, when the polarity inversion driving method switching signal SPOL is maintained at the low level, the field-effect transistor 4213 is maintained in an off state.

Figure 7:
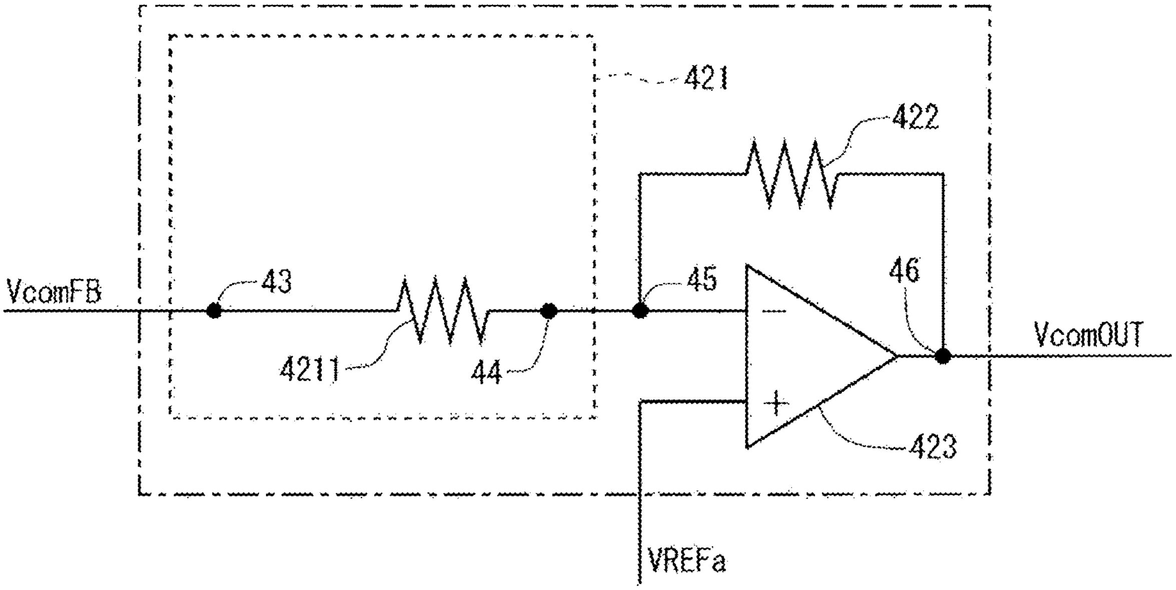
FIG. 7 is a circuit diagram for describing a Vcom feedback circuit when a two-column inversion driving method is applied in the embodiment.

As described above, when the two-column inversion driving method is applied, the field-effect transistor 4213 is maintained in the off state. At this time, the Vcom feedback circuit 420 is equivalent to the circuit illustrated in FIG. 7. Thus, the combined resistance value Ra2 is expressed by Equation (1) below.

$$Ra2 = R1 \tag{1}$$

Figure 8:
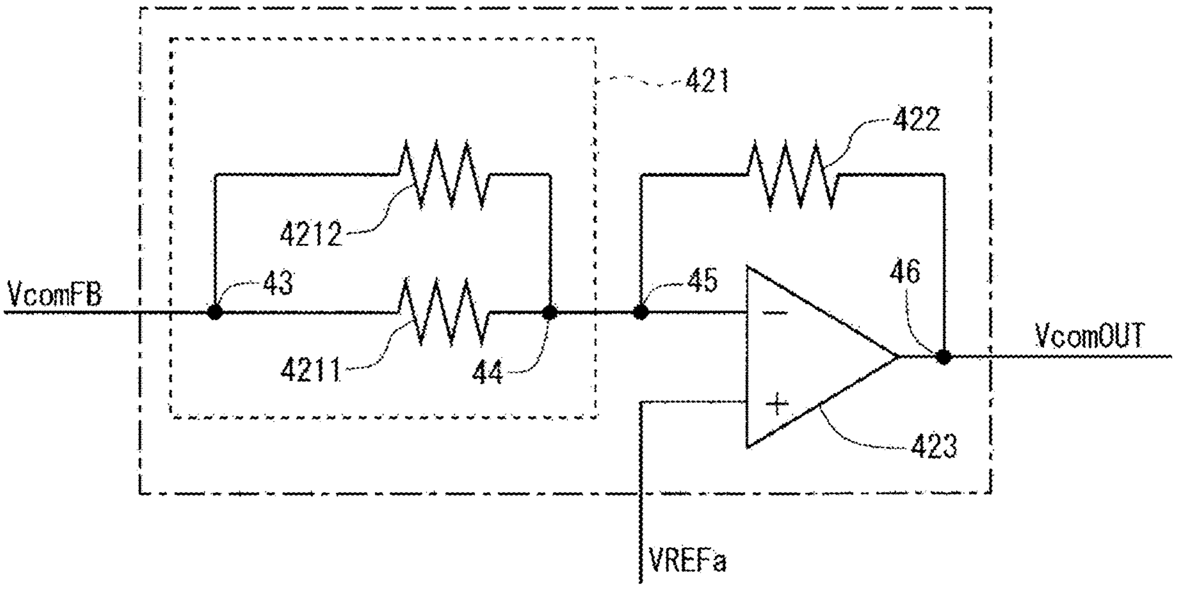
FIG. 8 is a circuit diagram for describing the Vcom feedback circuit when a one-column inversion driving method is applied in the embodiment.

On the other hand, when the one-column inversion driving method is applied, the field-effect transistor 4213 is maintained in the on state. At this time, the Vcom feedback circuit 420 is equivalent to the circuit illustrated in FIG. 8. Since Equation (2) below holds with regard to the combined resistance value Ra1, the combined resistance value Ra1 is expressed by Equation (3) below.

[Equation 1]

$$\frac{1}{Ra1} = \frac{1}{R1} + \frac{1}{R2} \tag{2}$$

[Equation 2]

$$Ra1 = \frac{R1 \times R2}{R1 + R2} \tag{3}$$

Here, from above Equation (1) and above Equation (3), Equation (4) below holds.

[Equation 3]

$$\begin{aligned} Ra2 - Ra1 &= R1 - \frac{R1 \times R2}{R1 + R2} \\ &= \frac{R1 \times (R1 + R2) - R1 \times R2}{R1 + R2} \\ &= \frac{R1^2}{R1 + R2} \\ &> 0 \end{aligned} \tag{4}$$

From above Equation (4), it is understood that the combined resistance value Ra1 is larger than the combined resistance value Ra2. That is, the combined resistance value of the node 43 and the node 44 is larger when the two-column inversion driving method is applied than when the one-column inversion driving method is applied. As described above, in the present embodiment, since the ratio of the resistance value of the resistor 422 to the combined resistance value is the correction intensity, the correction intensity is larger when the one-column inversion driving method is applied than when the two-column inversion driving method is applied.

As described above, the adjustment circuit 421 in the Vcom feedback circuit 420 is configured such that the combined resistance value of the node 43 (the node to which the feedback voltage VcomFB is supplied) and the node 44 (the node connected to the inverting input terminal of the operational amplifier 423) can be adjusted in accordance with the applied polarity inversion driving method. More specifically, the adjustment circuit 421 in the Vcom feedback circuit 420 causes the combined resistance value when the applied polarity inversion driving method is the one-column inversion driving method to be smaller than the combined resistance value when the applied polarity inversion driving method is the two-column inversion driving method.

Figure 9:
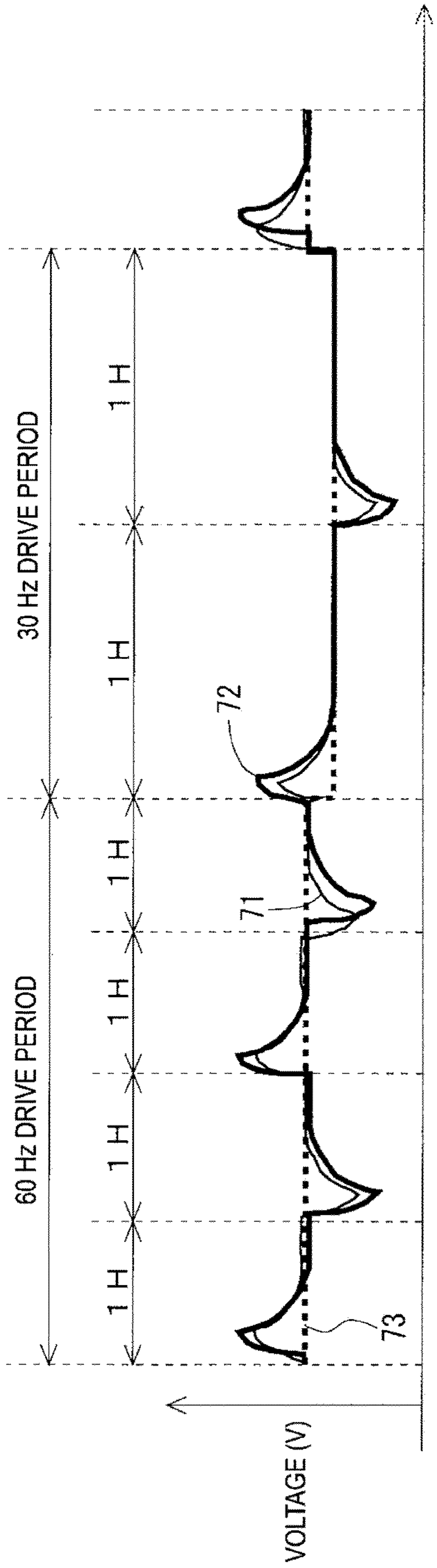
FIG. 9 is a waveform diagram for describing fluctuations of an in-panel common voltage according to the embodiment.
Figure 18:
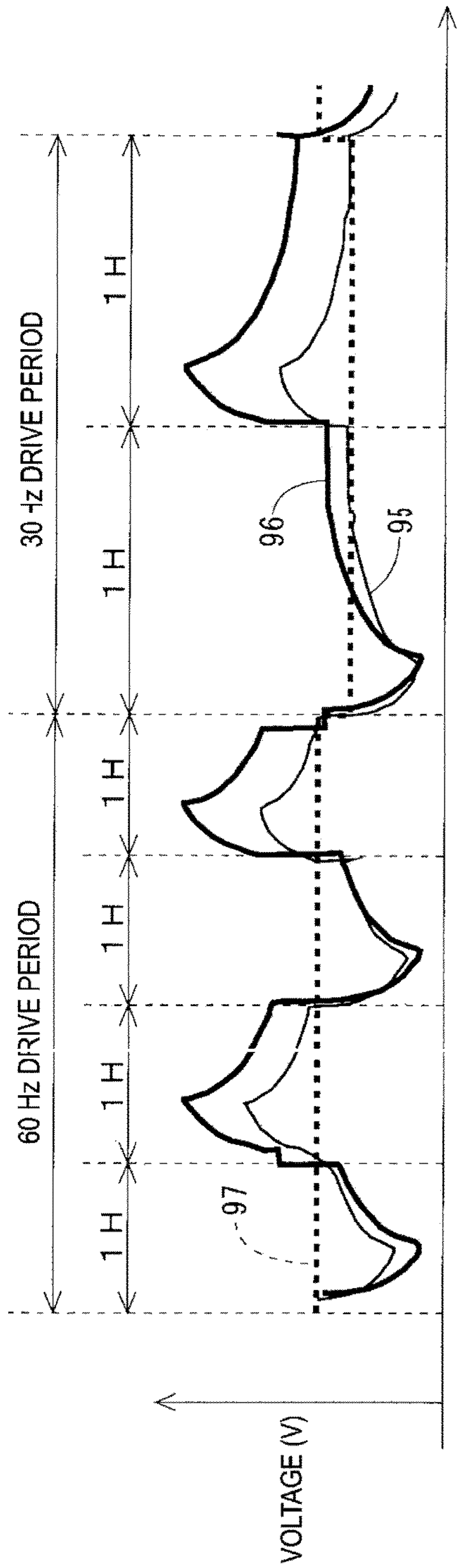
FIG. 18 (Prior Art)
FIG. 18 is a waveform diagram illustrating a difference in the fluctuations of the in-panel common voltage between when the one-column inversion driving method is adopted and when the two-column inversion driving method is adopted in the known technique.

FIG. 9 is a waveform diagram for describing fluctuations of the in-panel common voltage according to the present embodiment. In FIG. 9, a thick dotted line denoted by a reference sign 73 is a waveform of the output common voltage VcomOUT. When the two-column inversion driving method is applied, the in-panel common voltage fluctuates, for example, as indicated by a solid line denoted by a reference sign 71 in FIG. 9. In contrast, when the one-column inversion driving method is applied, the in-panel common voltage fluctuates, for example, as indicated by a thick solid line 72 denoted by a reference sign 72 in FIG. 9. In an example of a known configuration illustrated in FIG. 18, the in-panel common voltage fluctuates to a greater extent when the one-column inversion driving method is applied than when the two-column inversion driving method is applied, but it can be understood from FIG. 9 that, in the present embodiment, there is no large difference in a degree of fluctuation of the in-panel common voltage between when the one-column inversion driving method is applied and when the two-column inversion driving method is applied. Note that, in FIG. 9, the waveform obtained when the one-column inversion driving method is applied and the waveform obtained when the two-column inversion driving method is applied are illustrated in both the 60 Hz drive period and the 30 Hz drive period, but in actuality, the polarity inversion is performed using the two-column inversion driving method in the period in which the drive frequency is 60 Hz, and the polarity inversion is performed using the one-column inversion driving method in the period in which the drive frequency is 30 Hz, for example.

Figure 10:
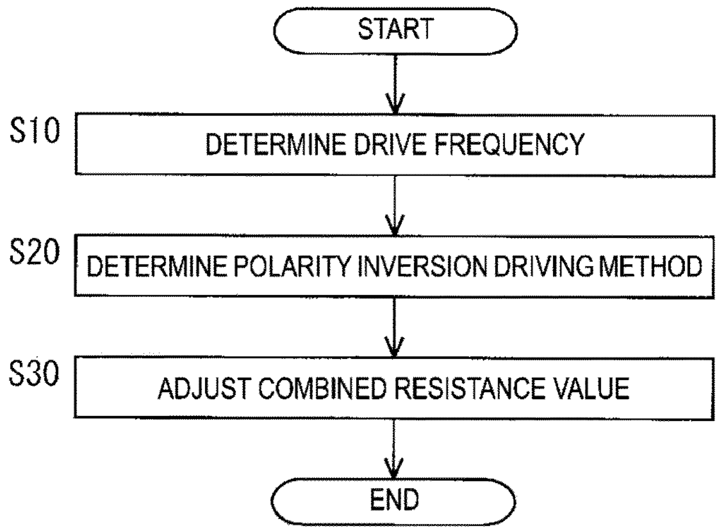
FIG. 10 is a flowchart for describing a flow of processing relating to adjustment of a correction intensity according to the embodiment.
Figure 11:
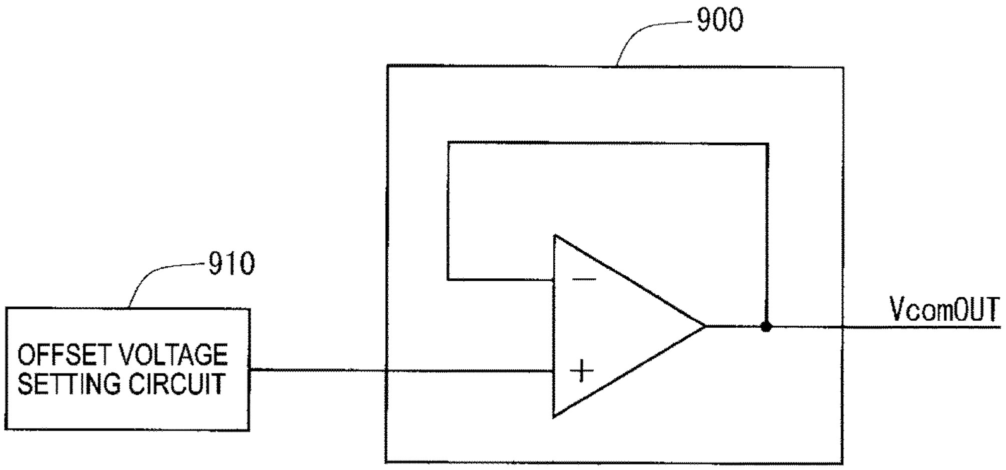
FIG. 11(Prior Art)
FIG. 11 is a diagram illustrating an example of a configuration for generating an output common voltage in a known technique.
Figure 12:
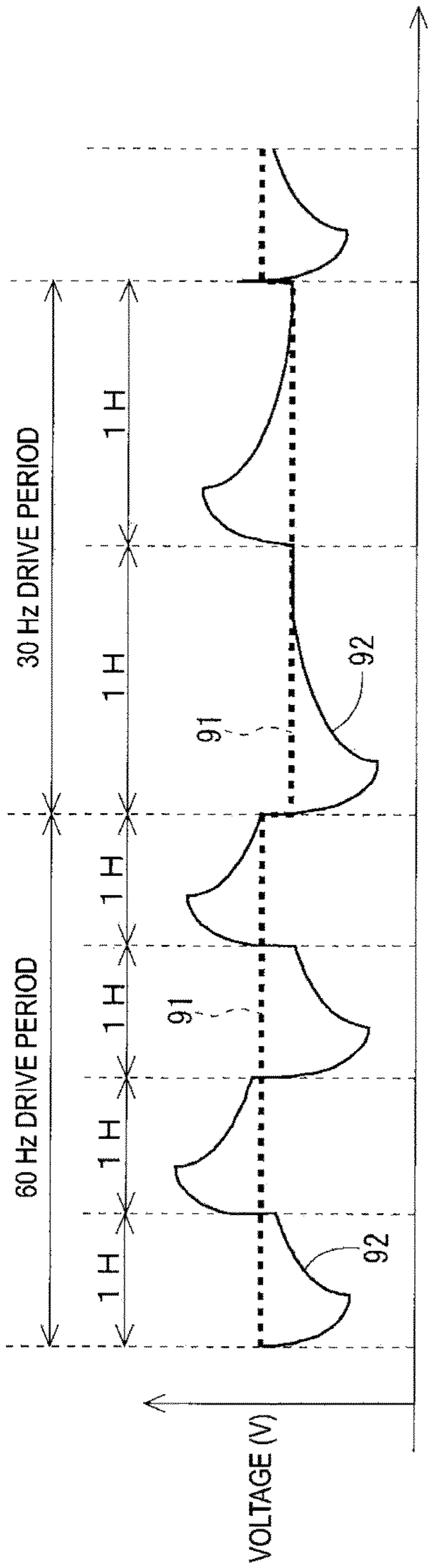
FIG. 12(Prior Art)
FIG. 12 is a waveform diagram for describing fluctuations of the in-panel common voltage in the known technique.
Figure 13:
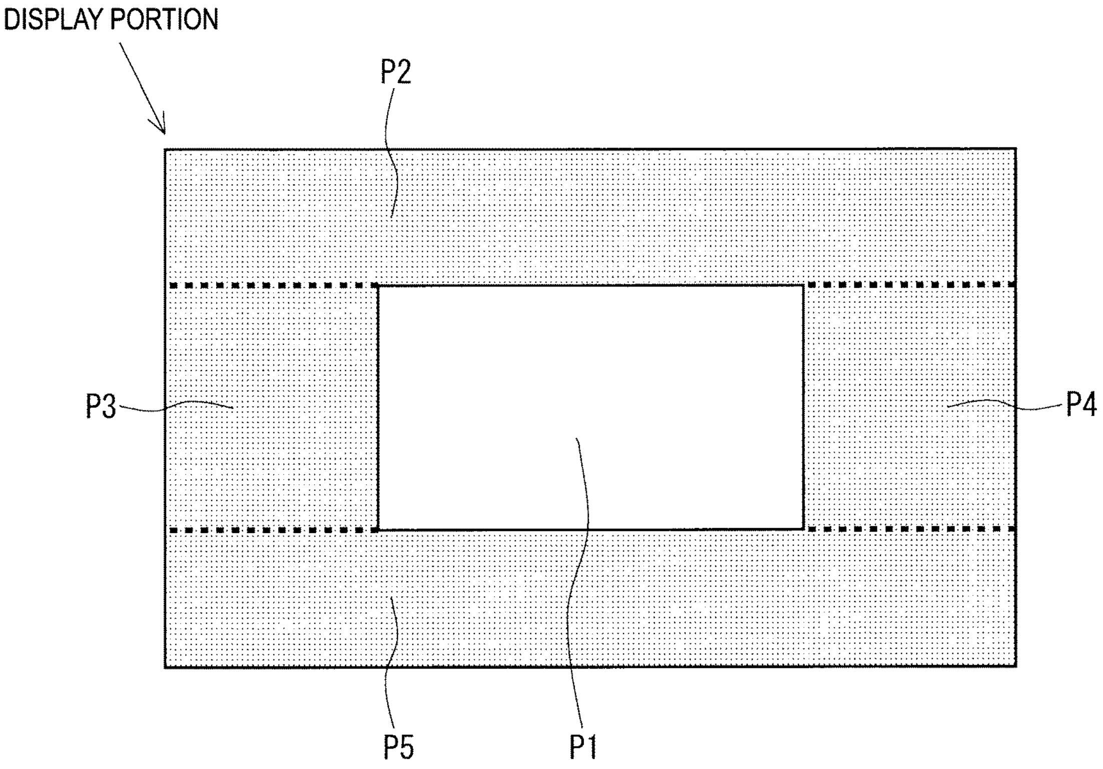
FIG. 13 (Prior Art)
FIG. 13 is a diagram for describing crosstalk occurring in the known technique.
Figure 14:
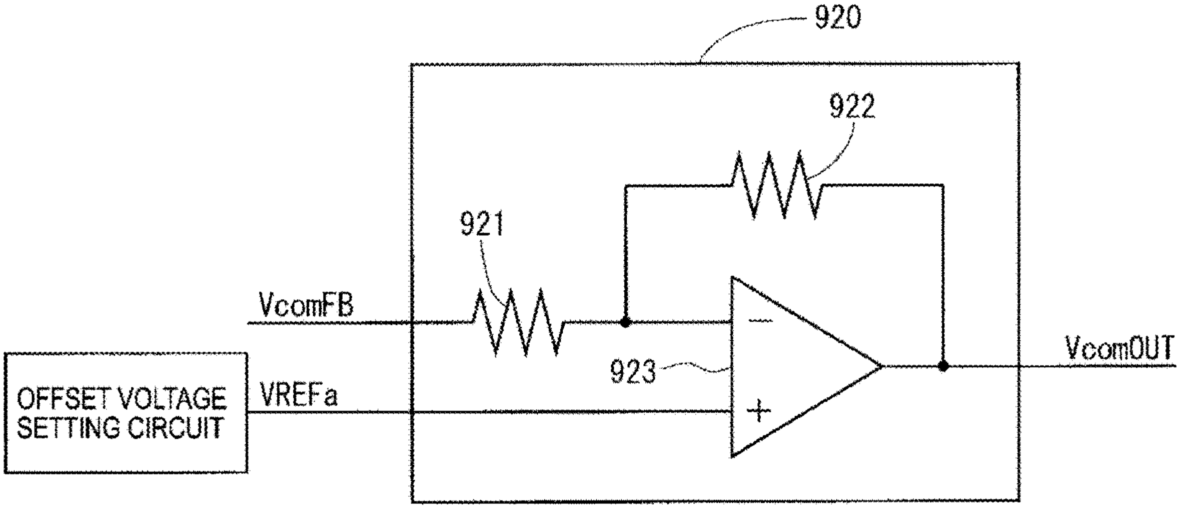
FIG. 14(Prior Art)
FIG. 14 is a circuit diagram illustrating a configuration of the Vcom feedback circuit in the known technique.
Figure 15:
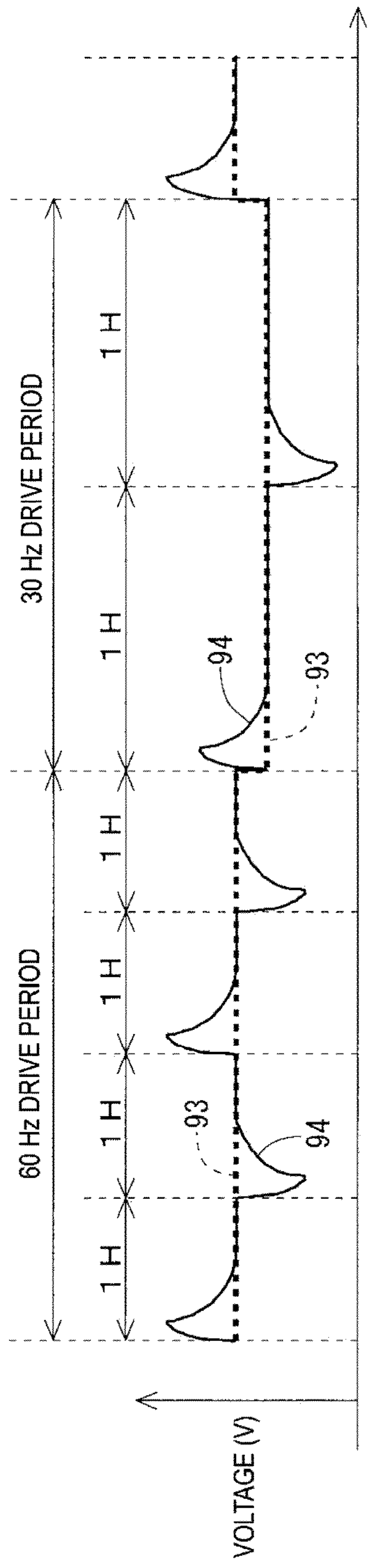
FIG. 15(Prior Art)
FIG. 15 is a waveform diagram for describing the fact that the occurrence of crosstalk is suppressed by providing the Vcom feedback circuit in the known technique.
Figure 16:
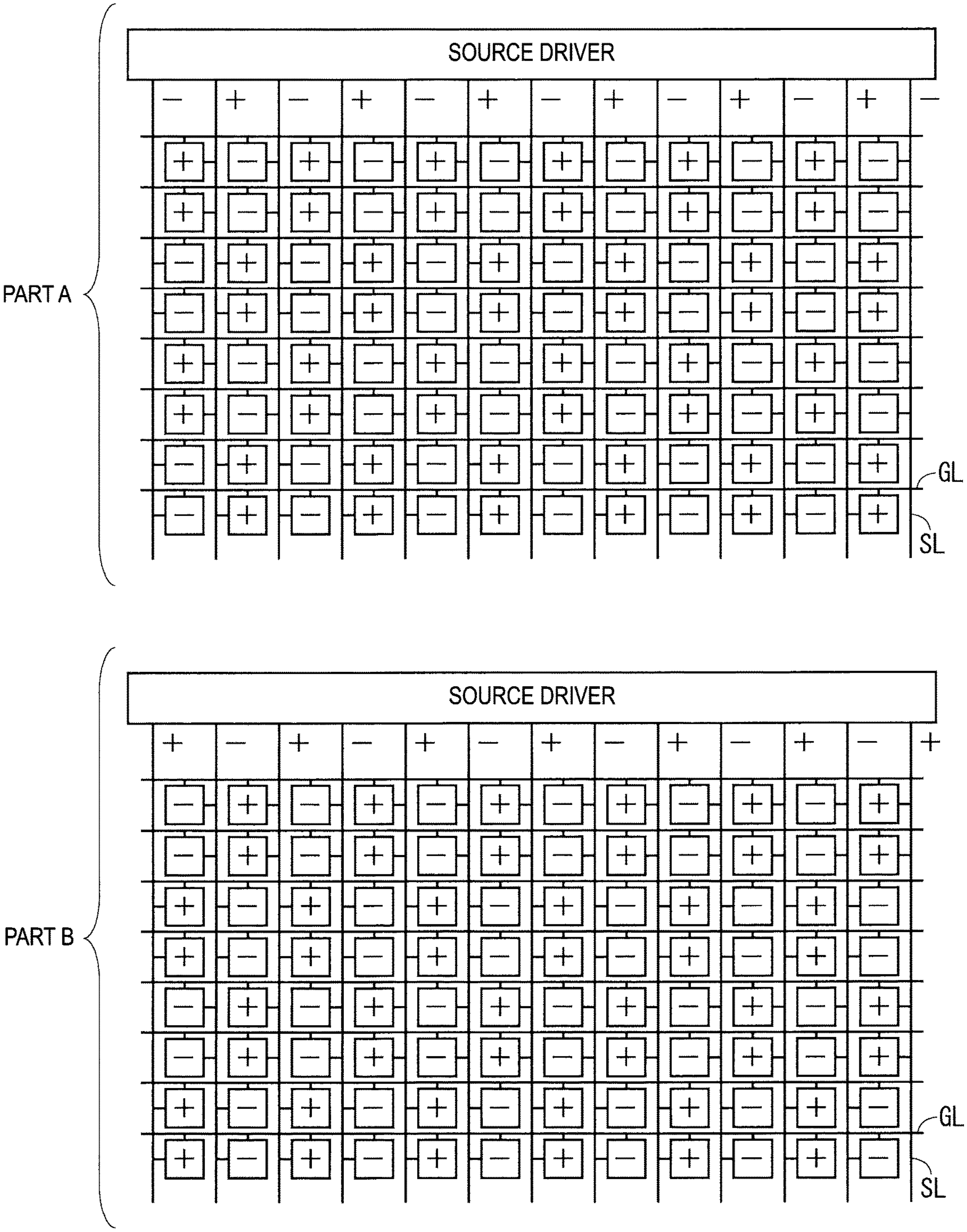
FIG. 16 (Prior Art)
FIG. 16 is a diagram illustrating a change in a state of polarity when the one-column inversion driving method is adopted in the known technique.
Figure 17:
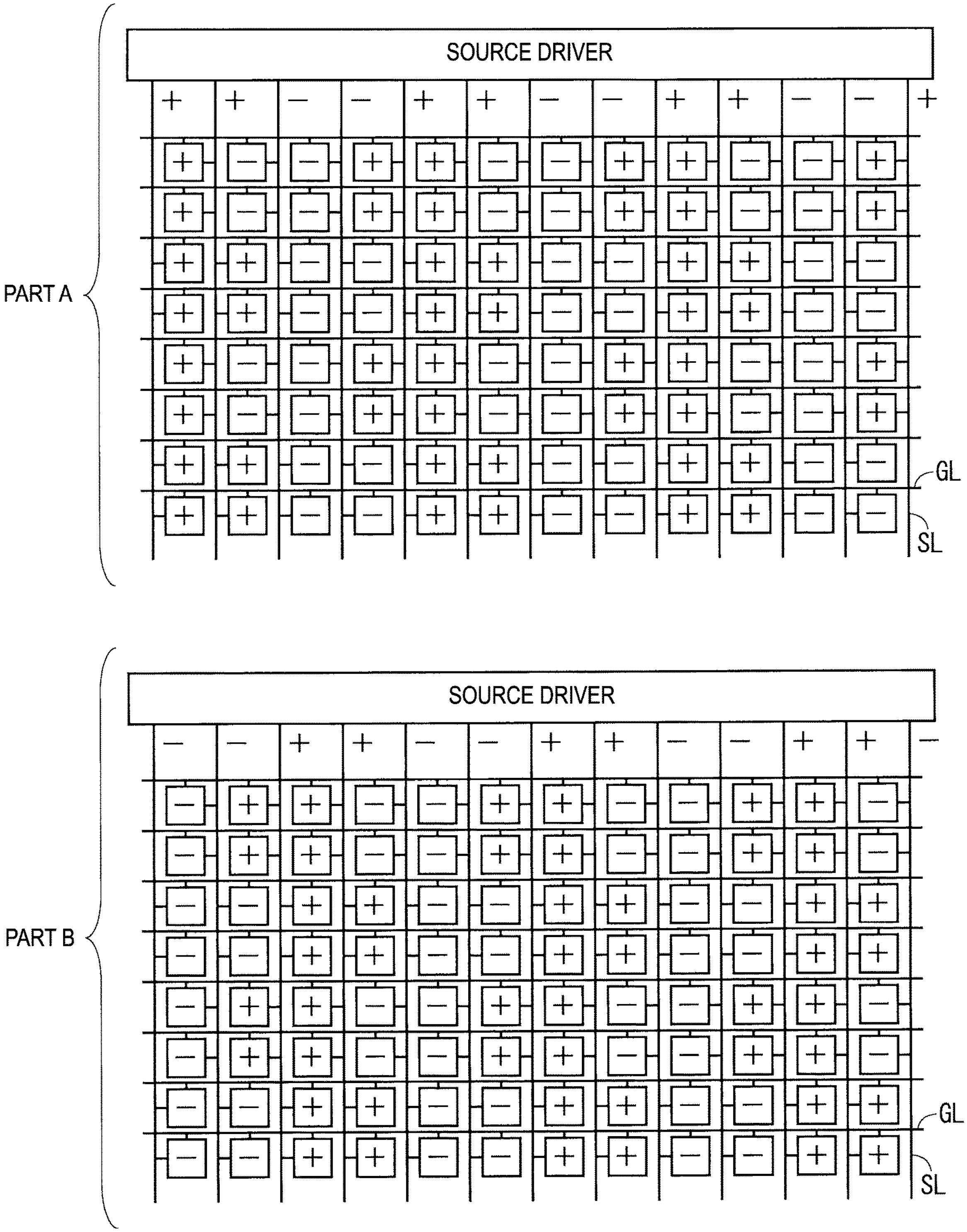
FIG. 17 (Prior Art)
FIG. 17 is a diagram illustrating a change in the state of polarity when the two-column inversion driving method is adopted in the known technique.

FIG. 10 is a flowchart for describing a flow of processing relating to the adjustment of the correction intensity. First, the drive frequency determination portion 110 in the timing controller 100 determines the drive frequency at a predetermined timing (step S10). In the present embodiment, it is determined whether the drive frequency is 60 Hz or 30 Hz.

Subsequently, in accordance with the drive frequency determined at step S10 (i.e., in accordance with the drive frequency determined by the drive frequency determination portion 110), the polarity inversion driving method determination portion 120 in the timing controller 100 determines the polarity inversion driving method to be either the one-column inversion driving method or the two-column inversion driving method (step S20). Specifically, when the drive frequency determined at step S10 is 60 Hz, the polarity inversion driving method is determined to be the two-column inversion driving method, and when the drive frequency determined at step S10 is 30 Hz, the polarity inversion driving method is determined to be the one-column inversion driving method. Note that when the drive frequency determined at step S10 is 60 Hz, the polarity inversion driving method determination portion 120 sets the polarity inversion driving method switching signal SPOL to the low level, and when the drive frequency determined at step S10 is 30 Hz, the polarity inversion driving method determination portion 120 sets the polarity inversion driving method switching signal SPOL to the high level.

Subsequently, the combined resistance value of the node 43 and the node 44 in the adjustment circuit 421 is adjusted in accordance with the polarity inversion driving method determined at step S20 (step S30). Specifically, when the polarity inversion driving method determined at step S20 is the two-column inversion driving method, the field-effect transistor 4213 in the adjustment circuit 421 is turned off by the polarity inversion driving method switching signal SPOL at the low level, and as described above, the Vcom feedback circuit 420 becomes equivalent to the circuit illustrated in FIG. 7. As a result, the combined resistance value as illustrated in above Equation (1) is obtained. On the other hand, when the polarity inversion driving method determined at step S20 is the one-column inversion driving method, the field-effect transistor 4213 in the adjustment circuit 421 is turned on by the polarity inversion driving method switching signal SPOL at the high level, and as described above, the Vcom feedback circuit 420 becomes equivalent to the circuit illustrated in FIG. 8. As a result, the combined resistance value as illustrated in above Equation (3) is obtained. At step S30, the combined resistance value is adjusted as described above. Since the above-described correction intensity depends on the combined resistance value, the correction intensity is also adjusted as a result of the combined resistance value being adjusted at step S30.

Note that, in the present embodiment, determining a drive frequency is realized by step S10, determining a polarity inversion driving method is realized by step S20, and adjusting a combined resistance value is realized by step S30. In addition, with regard to the drive frequency, 60 Hz corresponds to a first frequency, and 30 Hz corresponds to a second frequency.

5. EFFECTS

According to the present embodiment, the common electrode driver 400 includes the Vcom feedback circuit 420 that outputs, as the output common voltage VcomOUT, the voltage obtained by correcting the target voltage, which is the voltage to be applied to the common electrodes 54 (the voltage supplied to the non-inverting input terminal of the operational amplifier 423 constituting the inverting amplifier), based on the feedback voltage VcomFB (the voltage obtained by feeding back the in-panel common voltage through the dedicated wiring line 7). The Vcom feedback circuit 420 includes the adjustment circuit 421 that is configured to be able to adjust the combined resistance value of the node 44, which is connected to the inverting input terminal of the operational amplifier 423 and to the one end of the resistor 422, and the node 43 to which the feedback voltage VcomFB is supplied. With the configuration described above, in the Vcom feedback circuit 420, the inverting amplifier is constituted of the operational amplifier 423, the resistor 422, and the adjustment circuit 421. Here, the combined resistance value is adjusted in accordance with the applied polarity inversion driving method. That is, with regard to the inverting amplifier, the ratio (correction intensity) of the resistance value of the resistor 422 to the combined resistance value is adjusted in accordance with the applied polarity inversion driving method. Specifically, the correction intensity is caused to be larger when the one-column inversion driving method is applied than when the two-column inversion driving method is applied. As a result, the in-panel common voltage is prevented from significantly fluctuating when the one-column inversion driving method is applied. As a result, a deterioration in display quality is suppressed when the one-column inversion driving method is being applied. As described above, according to the present embodiment, it is possible to realize a liquid crystal display device capable of operating while performing switching between polarity inversion driving methods without causing a deterioration in display quality.

6. ADDITIONAL REMARKS

Although an example in which the polarity inversion driving method is switched between the one-column inversion driving method and the two-column inversion driving method has been described in the above embodiment, the configuration is not limited thereto. The disclosure can be applied to a liquid crystal display device in which the polarity inversion driving method is switched between the one-column inversion driving method and an N-column inversion driving method, where N is an integer of two or more. In addition, the internal configuration of the adjustment circuit 421 is not limited to the configuration illustrated in FIG. 1, as long as a combined resistance value of the dedicated wiring line 7 for transmitting the feedback voltage VcomFB and the node 45 (the node connected to the one end of the resistor 422 and to the inverting input terminal of the operational amplifier 423) can be adjusted.

Although the disclosure has been described in detail above, the above description is exemplary in all respects and is not limited thereto. It is understood that numerous other modifications or variations can be made without departing from the scope of the disclosure.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal display device comprising:
a display portion including:
a plurality of video signal lines,
a plurality of scanning signal lines,
a plurality of pixel electrodes corresponding, respectively, to intersections between the plurality of video signal lines and the plurality of scanning signal lines, and
a common electrode provided common to the plurality of pixel electrodes;
a video signal line drive circuit configured to drive the plurality of video signal lines;
a scanning signal line drive circuit configured to drive the plurality of scanning signal lines; and
a common electrode drive circuit configured to drive the common electrode,
wherein the liquid crystal display device is configured to perform switching between polarity inversion driving methods for inverting a polarity of a voltage applied between each of the plurality of pixel electrodes and the common electrode, and
the common electrode drive circuit includes;
an operational amplifier including:
an inverting input terminal,
a non-inverting input terminal to which a reference voltage is supplied, the reference voltage being a voltage to be applied to the common electrode, and
an output terminal connected to the common electrode,
a first resistor, one end of the first resistor being connected to the inverting input terminal of the operational amplifier, and another end of the first resistor being connected to the output terminal of the operational amplifier, and
an adjustment circuit including a first terminal to which a feedback voltage of the voltage to be applied to the common electrode is supplied and a second terminal connected to the inverting input terminal of the operational amplifier, the adjustment circuit being configured to adjust a combined resistance value of the first terminal and the second terminal in accordance with the switching between the polarity inversion driving methods for inverting the polarity of the voltage applied between each of the plurality of pixel electrodes and the common electrode.

2. The liquid crystal display device according to claim 1, wherein the liquid crystal display device is configured to perform the switching between:
a one-column inversion driving method, among the polarity inversion driving methods, in which the polarity of the voltage applied between each of the plurality of pixel electrodes and the common electrode is inverted for every one of the plurality of video signal lines in a direction in which the plurality of scanning signal lines extends, and
an N-column inversion driving method, among the polarity inversion driving methods, in which the polarity of the voltage applied between each of the plurality of pixel electrodes and the common electrode is inverted for every N of the plurality of video signal lines in the direction in which the plurality of scanning signal lines extends, N being an integer having a value of two or more, and
the adjustment circuit is configured to cause the combined resistance value obtained, when the one-column inversion driving method is an applied polarity inversion driving method, is smaller than the combined resistance value obtained when the N-column inversion driving method is the applied polarity inversion driving method.

3. The liquid crystal display device according to claim 1, wherein the adjustment circuit further includes:
a second resistor, one end of the second resistor being connected to the first terminal, and another end of the second resistor being connected to the second terminal,
a third resistor provided in parallel with the second resistor between the first terminal and the second terminal, and
a switching element provided in series with the third resistor between the first terminal and the second terminal, and including a control terminal, a first conduction terminal, and a second conduction terminal, and
a switching control signal configured to control a state of the switching element in accordance with an applied polarity inversion driving method, among the polarity inversion driving methods, is supplied to the control terminal of the switching element.

4. The liquid crystal display device according to claim 3, further comprising:

a timing control circuit configured to control an operation of the video signal line drive circuit, an operation of the scanning signal line drive circuit, and an operation of the common electrode drive circuit, wherein the liquid crystal display device is further configured to perform switching of drive frequencies between a first frequency and a second frequency that is lower than the first frequency, and the timing control circuit includes:

a drive frequency determination portion configured to determine a drive frequency to be either the first frequency or the second frequency, and a polarity inversion driving method determination portion configured to determine the polarity inversion driving method based on the drive frequency determined by the drive frequency determination portion, and to output the switching control signal in accordance with the determined polarity inversion driving method.

5. The liquid crystal display device according to claim 4, wherein the liquid crystal display device is configured to perform the switching between:

a one-column inversion driving method, among the polarity inversion driving methods, in which the polarity of the voltage applied between each of the plurality of pixel electrodes and the common electrode is inverted for every one of the plurality of video signal lines in a direction in which the plurality of scanning signal lines extends, and an N-column inversion driving method, among the polarity inversion driving methods, in which the polarity of the voltage applied between each of the plurality of pixel electrodes and the common electrode is inverted for every N of the plurality of video signal lines in the direction in which the plurality of scanning signal lines extends, N being an integer having a value of two or more, and the polarity inversion driving method determination portion is configured to:

determine the polarity inversion driving method to be the N-column inversion driving method when the drive frequency determined by the drive frequency determination portion is the first frequency, and determine the polarity inversion driving method to be the one-column inversion driving method when the drive frequency determined by the drive frequency determination portion is the second frequency.

6. The liquid crystal display device according to claim 5, wherein the adjustment circuit is further configured to:

maintain the switching element in an on state when the one-column inversion driving method is the applied polarity inversion driving method, and maintain the switching element in an off state when the N-column inversion driving method is the applied polarity inversion driving method.

7. The liquid crystal display device according to claim 3, wherein the liquid crystal display device is configured to perform the switching between:

a one-column inversion driving method, among the polarity inversion driving methods, in which the polarity of the voltage applied between each of the plurality of pixel electrodes and the common electrode is inverted for every one of the plurality of video signal lines in a direction in which the plurality of scanning signal lines extends, and an N-column inversion driving method, among the polarity inversion driving methods, in which the polarity of the voltage applied between each of the plurality of pixel electrodes and the common electrode is inverted for every N of the plurality of video signal lines in the direction in which the plurality of scanning signal lines extends, N being an integer having a value of two or more, and the adjustment circuit is further configured to:

maintain the switching element in an on state when the one-column inversion driving method is the applied polarity inversion driving method, and maintain the switching element in an off state when the N-column inversion driving method is the applied polarity inversion driving method.

8. A driving method performed by a liquid crystal display device, the liquid crystal display device including;

a display portion including:

a plurality of video signal lines, a plurality of scanning signal lines, a plurality of pixel electrodes corresponding, respectively, to intersections between the plurality of video signal lines and the plurality of scanning signal lines, and a common electrode provided common to the plurality of pixel electrodes, a video signal line drive circuit configured to drive the plurality of video signal lines, a scanning signal line drive circuit configured to drive the plurality of scanning signal lines, and a common electrode drive circuit configured to drive the common electrode, and including:

an operational amplifier including:

an inverting input terminal, a non-inverting input terminal to which a reference voltage is supplied, the reference voltage being a voltage to be applied to the common electrode, and an output terminal connected to the common electrode, a first resistor, one end of the first resistor being connected to the inverting input terminal of the operational amplifier, and another end of the first resistor being connected to the output terminal of the operational amplifier, and an adjustment circuit including a first terminal to which a feedback voltage of the voltage to be applied to the common electrode is supplied, a second terminal connected to the inverting input terminal of the operational amplifier, and at least one resistor, and the driving method comprising:

determining a drive frequency to be either a first frequency or a second frequency that is lower than the first frequency;

determining, in accordance with the determined drive frequency, a polarity inversion driving method to be either a one-column inversion driving method in which a polarity of a voltage applied between each of the plurality of pixel electrodes and the common electrode is inverted for every one of the plurality of video signal lines in a direction in which the plurality of scanning signal lines extends, or an N-column inversion driving method in which a polarity of a voltage applied between each of the plurality of pixel electrodes and the common electrode is inverted for every N of the plurality of video signal lines in the direction in which the plurality of scanning signal lines extends, N being an integer having a value of two or more; and adjusting, in accordance with the determined polarity inversion driving method, a combined resistance value of the first terminal and the second terminal.

* * * * *